United States Patent
Engström et al.

(10) Patent No.: US 8,320,357 B2
(45) Date of Patent: Nov. 27, 2012

(54) WIRELESS TELECOMMUNICATIONS SYSTEM WITH IMPROVED TRANSMISSION CAPACITY

(75) Inventors: Anna Barbro Ulrika Engström, Floda (SE); Björn Gunnar Johannisson, Kungsbacka (SE); Martin Nils Johansson, Mölndal (SE); Dag Jungenfelt, Billdal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1129 days.

(21) Appl. No.: 11/994,621

(22) PCT Filed: Jul. 1, 2005

(86) PCT No.: PCT/SE2005/001057
§ 371 (c)(1),
(2), (4) Date: Jan. 3, 2008

(87) PCT Pub. No.: WO2007/004924
PCT Pub. Date: Jan. 11, 2007

(65) Prior Publication Data
US 2008/0198834 A1  Aug. 21, 2008

(51) Int. Cl.
*H04J 3/16* (2006.01)
*H04B 7/208* (2006.01)
*H04B 1/18* (2006.01)
*H04B 17/02* (2006.01)

(52) U.S. Cl. .............. 370/346; 370/344; 455/172.2; 455/136

(58) Field of Classification Search .......... 370/346
See application file for complete search history.

(56) References Cited

U.S. PATENT DOCUMENTS

| | | | | |
|---|---|---|---|---|
| 5,886,988 A * | 3/1999 | Yun et al. | ............... | 370/329 |
| 6,236,646 B1 * | 5/2001 | Beming et al. | ........... | 370/335 |
| 6,834,043 B1 * | 12/2004 | Vook et al. | ............. | 370/310 |
| 6,836,469 B1 * | 12/2004 | Wu | ...................... | 370/322 |
| 6,999,771 B1 * | 2/2006 | Kasapi et al. | ........... | 455/450 |
| 7,089,037 B2 * | 8/2006 | Harris | ................. | 455/562.1 |
| 7,139,274 B2 * | 11/2006 | Attar et al. | ............. | 370/395.4 |
| 7,146,170 B2 * | 12/2006 | Davidson | ................ | 455/446 |
| 7,450,533 B2 * | 11/2008 | Aoki et al. | .............. | 370/310 |
| 7,623,441 B1 * | 11/2009 | Sampath et al. | .......... | 370/206 |
| 2004/0004945 A1 * | 1/2004 | Monsen | ................. | 370/328 |
| 2004/0174840 A1 * | 9/2004 | Yano et al. | .............. | 370/328 |
| 2005/0128966 A1 * | 6/2005 | Yee | ........................ | 370/310 |
| 2005/0136840 A1 * | 6/2005 | Molnar et al. | ............ | 455/63.1 |
| 2005/0141540 A1 * | 6/2005 | Li et al. | ................... | 370/437 |
| 2005/0152314 A1 * | 7/2005 | Sun et al. | ................ | 370/334 |
| 2005/0195784 A1 * | 9/2005 | Freedman et al. | ......... | 370/338 |
| 2008/0089269 A1 * | 4/2008 | Tsutsui | ................... | 370/316 |
| 2009/0004967 A1 * | 1/2009 | Anderson | ................. | 455/13.1 |

FOREIGN PATENT DOCUMENTS

| | | |
|---|---|---|
| EP | 1536584 | 6/2005 |
| EP | 1536584 A1 * | 6/2005 |
| JP | 2003-188790 A | 7/2003 |

* cited by examiner

*Primary Examiner* — Guang Li (57) ABSTRACT

A wireless telecommunications system for stationary or semi-stationary equipment includes a main node and a first plurality of terminals belonging to the same access subset and arranged to receive from and transmit to the main node. The main node transmits in at least one beam and receives in at least two beams, and the system indicates to the terminals that they may or may not transmit to the central node. Based upon certain criteria, two or more terminals located in different receive beams of the main node may be given permission to transmit to the central node simultaneously. Suitably, two or more terminals which are given permission to transmit simultaneously do so using the same frequency, or the same code, or the same time slot.

5 Claims, 6 Drawing Sheets

WIRELESS TELECOMMUNICATIONS SYSTEM WITH IMPROVED TRANSMISSION CAPACITY

This application claims the benefit of PCT Application No. PCT/SE2005/001057, filed Jul. 1, 2005, the disclosure of which is fully incorporated herein by reference.

TECHNICAL FIELD

The present invention relates to a wireless telecommunications system for stationary or semi-stationary equipment. The system comprises a central node and a first plurality of terminals which are arranged to receive from and transmit to the central node. The central node has the possibility to transmit in at least one beam and also has the possibility to receive in at least two beams. In addition, the system comprises means for indicating to terminals that they may or may not transmit to the central node.

BACKGROUND ART

Wireless telecommunications systems which comprise one central node which communicates with a number of subscribers or terminals are known.

The uplink, i.e. the connection from the terminals to the central node, is usually limited by interference between transmissions from the terminals. Different so called access schemes, such as e.g. TDMA, FDMA and CDMA, (Time/Frequency/Code Division Multiple Access) utilize different ways of separating subscribers within the allowed frequency spectrum in order to limit interference.

As a first example, in a TDMA (Time Division Multiple Access) scheme, the terminals are usually only allowed to transmit one at a time, in order to minimize interference. As a second example, in a CDMA (Code Division Multiple Access) scheme, the terminals are usually only allowed to transmit with unique spreading codes. In these and in other access schemes, one result is an upper limit on the capacity for transmission.

In systems of the kind described above, i.e. a wireless telecommunications systems with one central node which communicates with a number of subscribers or terminals, there is thus a need for a solution or a system by means of which the transmission capacity on the uplink can be increased.

This need is addressed by the present invention in that it discloses a wireless telecommunications system for stationary or semi-stationary equipment. The system comprises a main node, and a first plurality of terminals which belong to the same access subset and which are arranged to receive from and transmit to the main node (C).

The main node transmits in at least one antenna beam and receives in at least two antenna beams, and the system comprises means for indicating to terminals that they may or may not transmit to the central node.

Based upon certain criteria, two or more terminals located in different receive beams of the main node may be given permission to transmit to the central node simultaneously.

Suitably, two or more terminals which are given permission to transmit simultaneously do so using the same frequency or the same spreading code, or during the same time slot.

BRIEF DESCRIPTION OF THE DRAWINGS

The invention will be described in more detail with reference to the enclosed drawings, in which.

EMBODIMENTS OF THE INVENTION

The invention is mainly intended for systems with stationary or semi-stationary wireless communications systems, such as, for example, WLAN or WIMAX-systems, and can also be applied to microwave radio links which are based on a point-to-multipoint concept.

Figure 1:
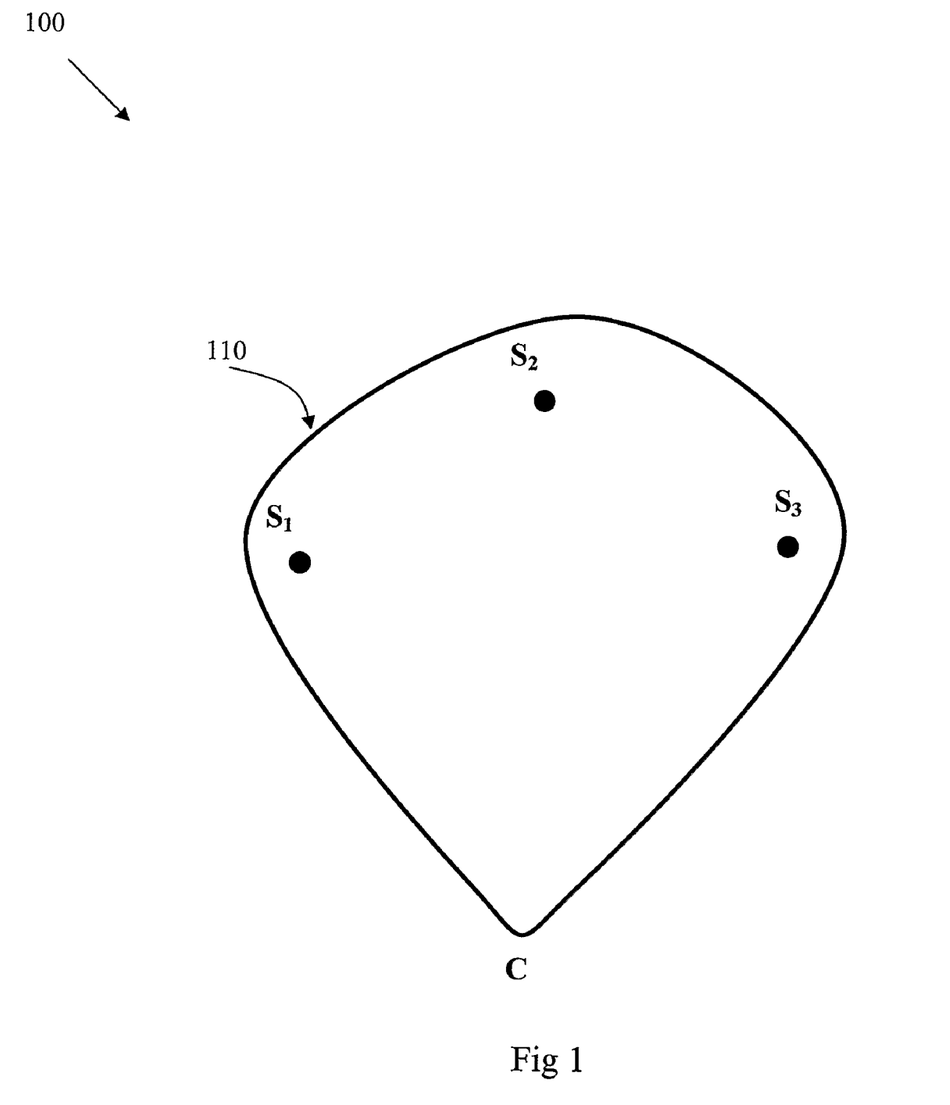
FIG. 1 shows prior art.

FIG. 1 shows a schematic overview of such a known system 100, in which the invention can be applied. The system comprises a central node, denoted by the letter C, and a number of terminals $S_1$, $S_2$, $S_3$, which communicate with the central node C. The terminals $S_1$-$S_3$ are terminals that allocate the same share of the access domain, i.e. they comprise a so called access subset. This can be exemplified with the subsets that utilize the same timeslot in a TDMA system, the same frequency slot in a FDMA system or the same part of a code tree in a CDMA system The central node C has one single antenna beam 110, which is used for all communication, transmission as well as reception, within the area which is covered by the node C. Thus, if the system 100, for the sake of clarity, is assumed to be a TDMA-system, then, in order to obtain good signal quality, only one of the access subset's terminals $S_1$-$S_3$ can be allowed to transmit at a time. The decision as to which of the terminals that should be allowed to transmit at any given point in time is made by the central node C, and transmitted to the terminals by C.

A problem with this known kind of system is that if only one of the access subset terminals can transmit at a time, the transmission capacity becomes limited to one terminal per access subset. Similar problems can be discerned within other access schemes, such as e.g. FDMA and CDMA. However, the system 100 and the system of the invention will in the rest of this description be described as a TDMA-system, the similarities with other access schemes being recognized by those skilled in the field.

Figure 2:
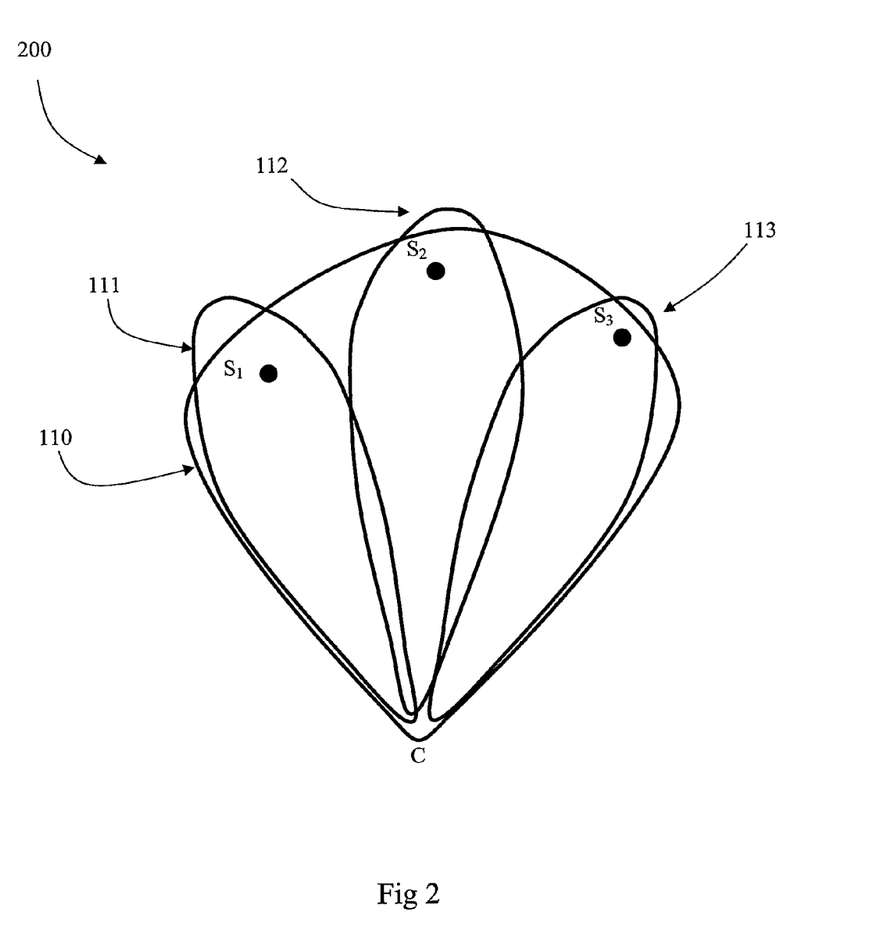
FIG. 2 shows a schematic overview of a system according to the invention.

In FIG. 2, a system 200 according to the invention is shown: the system comprises a central node C, where the central node transmits in one antenna beam 110 which essentially covers the entire area which it is desired to cover with the system 200.

Also shown in FIG. 2 are three terminals $S_1$, $S_2$, and $S_3$, the amount of terminals nodes merely being an example. These three terminals are the subset of terminals within the system 200 that allocate the same share of the access domain (access subset), i.e. the same timeslot in a TDMA system. According to the invention, the antenna used by the central node C receives in more than one antenna beam at a time, FIG. 2 showing, as an example, three receive beams 111, 112, 113.

Also, according to the invention, more than one of the terminals $S_1$-$S_3$ may be allowed to transmit to the central node C simultaneously. This is made possible partly by means of the multiple beams 111, 112, 113.

The permission to transmit to the central node C for each of the terminals $S_1$-$S_3$ is transmitted by the central node C in the transmit beam 110, the permission being based on certain pre-defined criteria which will be described in more detail below. These criteria are used together with information received by the central node C when transmitting a polling question or access request to the terminals $S_1$-$S_3$.

Figure 3:
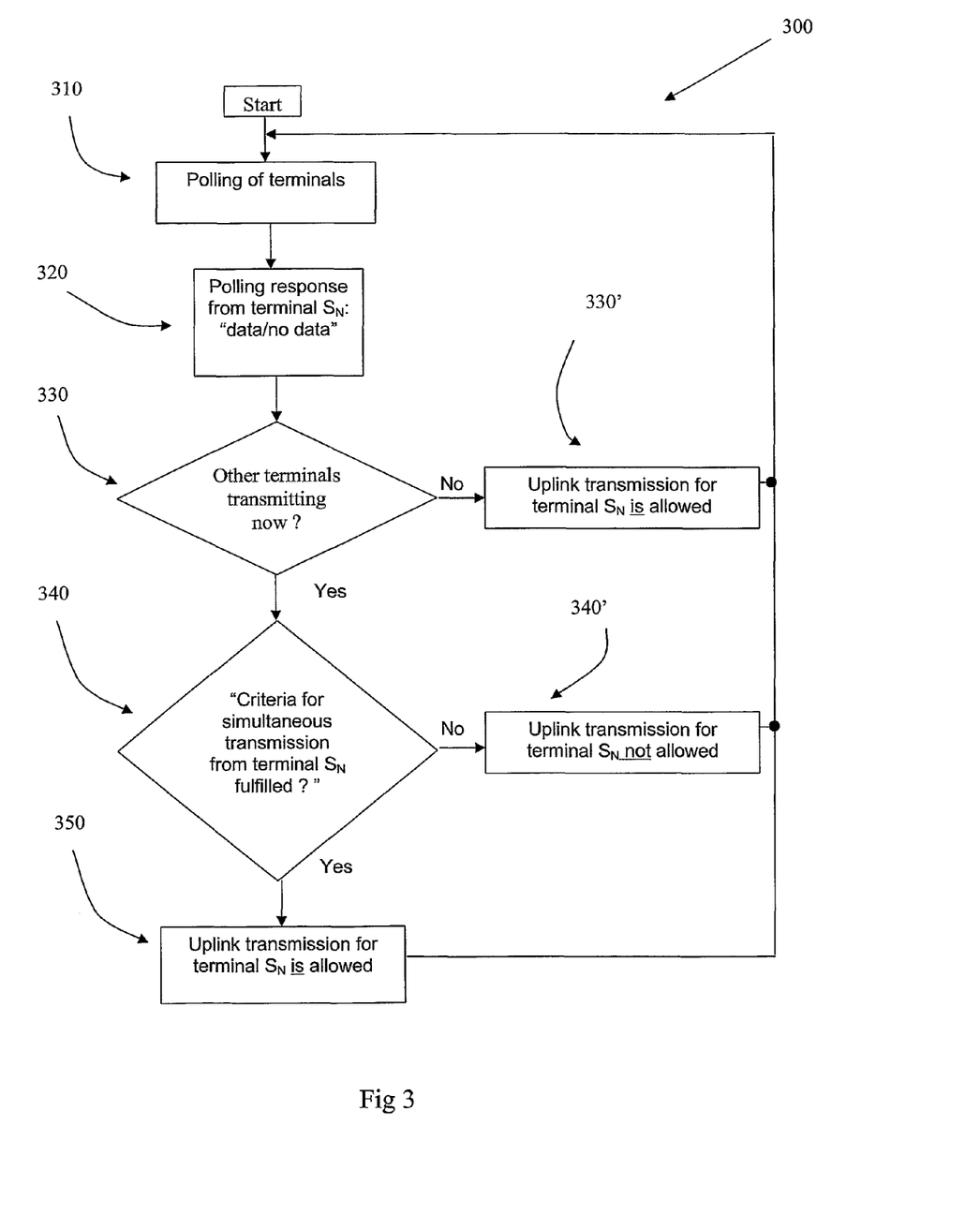
FIG. 3 shows a flow chart of some major steps for use with the invention.

FIG. 3 shows a flowchart for determining when and if transmission to the central node C for a terminal within the same access subset is to be allowed. As an initial step 310, an access request from a terminal is initiated through communication with the central node C. This can e.g. be done by C transmitting a poll question in the transmit beam 110. Subsequently, replies are then received, step 320, from the terminals $S_1$-$S_3$ present in the same access subset. The replies from the terminals contain information about whether the terminals have data to transmit or not, and possibly also the amount of data and the priority.

Next, in step 330, a check is made of how many other terminals in the same access subset that are transmitting at the moment. If the answer is that no other terminals in the same access subset are transmitting at the moment and one terminal within that access subset has data to transmit, permission to transmit is granted to that terminal in step 330'. The permission may e.g. be transmitted via the transmit beam 110.

On the other hand, if one of the terminals in the same access subset, here denoted as terminal $S_N$, needs to transmit data and there are other terminals in the same subset transmitting at the moment, the central node C checks to see if the criteria for simultaneous transmission for terminal $S_N$ are fulfilled, step 340 in the flowchart in FIG. 3. These criteria will be elaborated upon shortly.

If the criteria for simultaneous transmission are not fulfilled, permission for terminal $S_N$ to transmit is not granted, step 340' in FIG. 3. Preferably, this is not transmitted as a separate signal or message by the central node C.

If, however, the criteria for simultaneous transmission are fulfilled, permission is given for terminal $S_N$ to transmit, step 350. This permission is e.g. transmitted by the central node C in the transmit beam 110.

Figure 4:
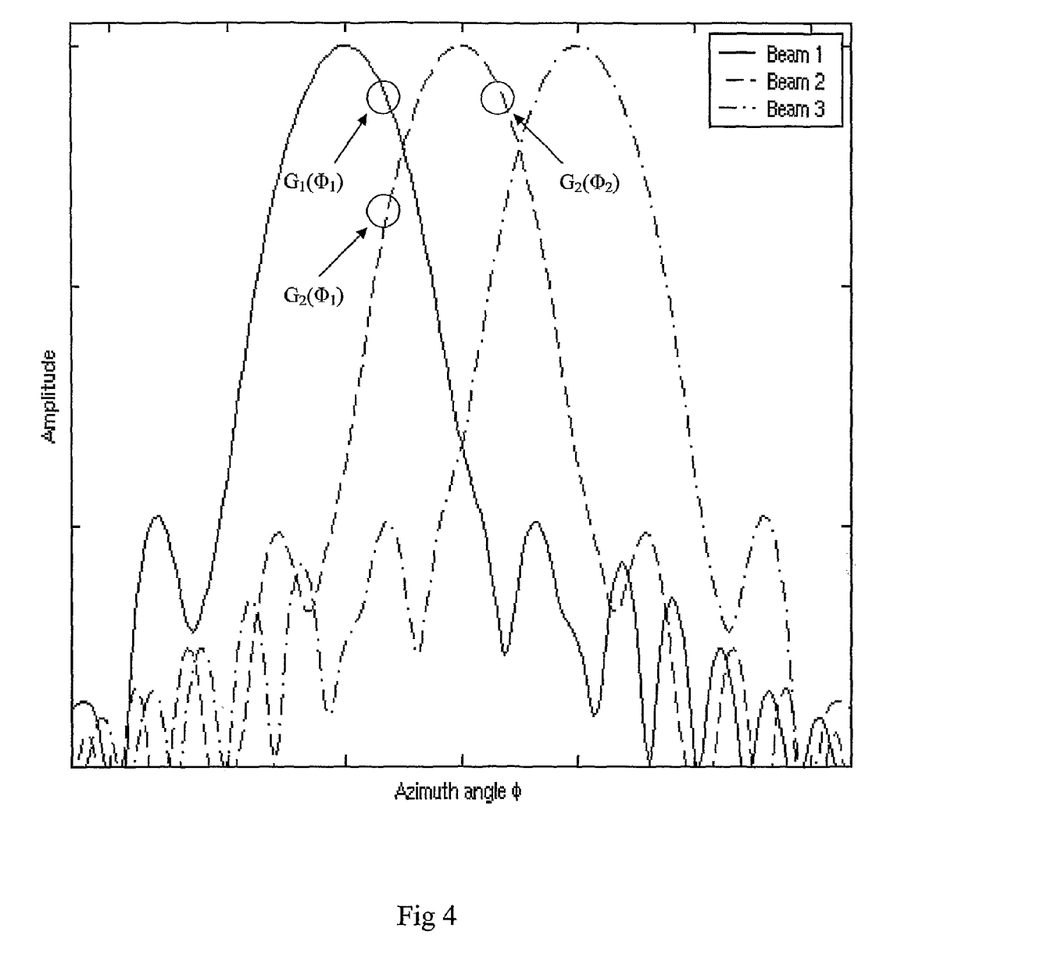
FIG. 4 shows an example of a criterion for use with the invention.
Figure 5:
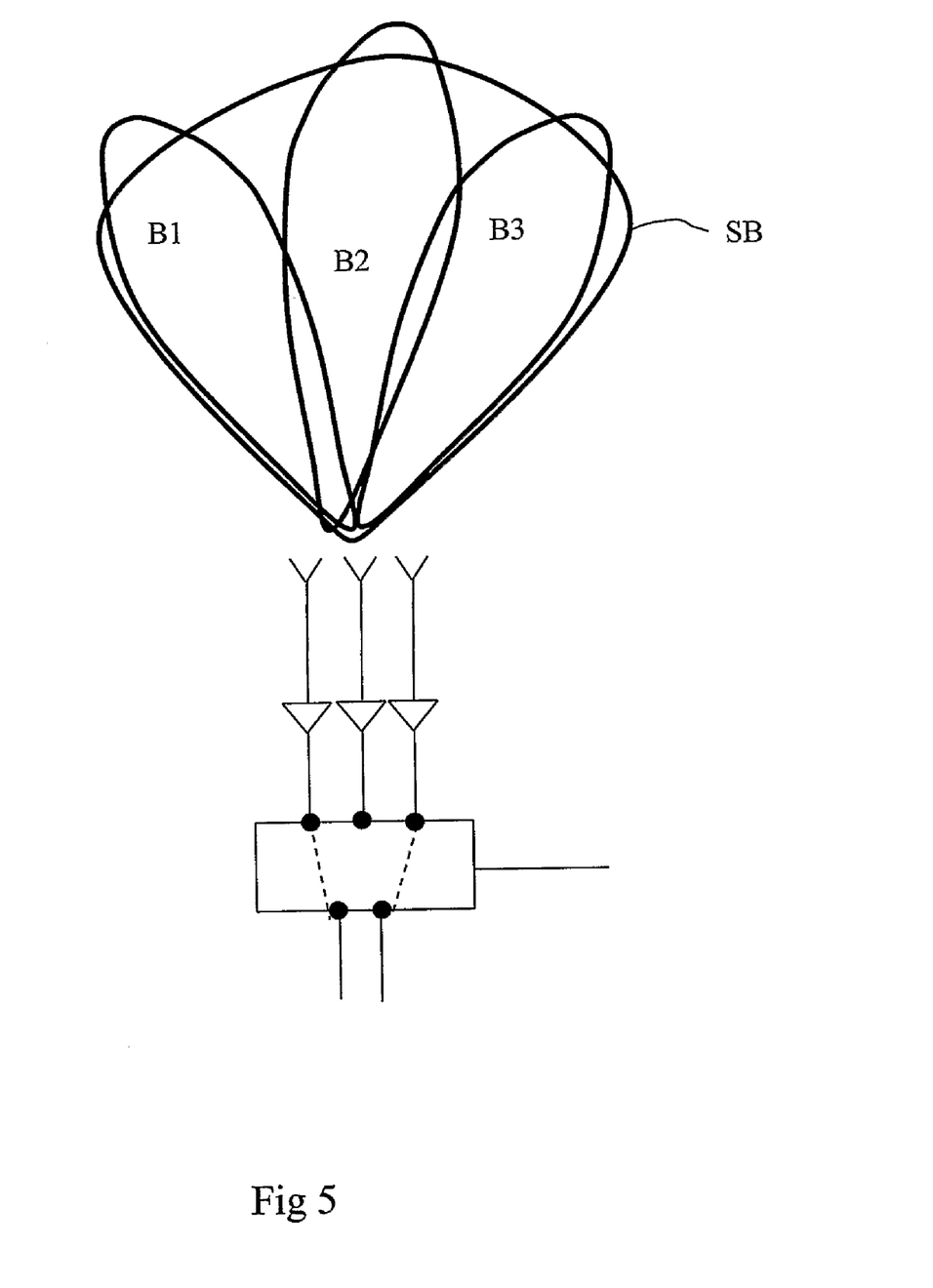
FIGS. 5 and 6 show variations of systems according to the invention.
Figure 6:
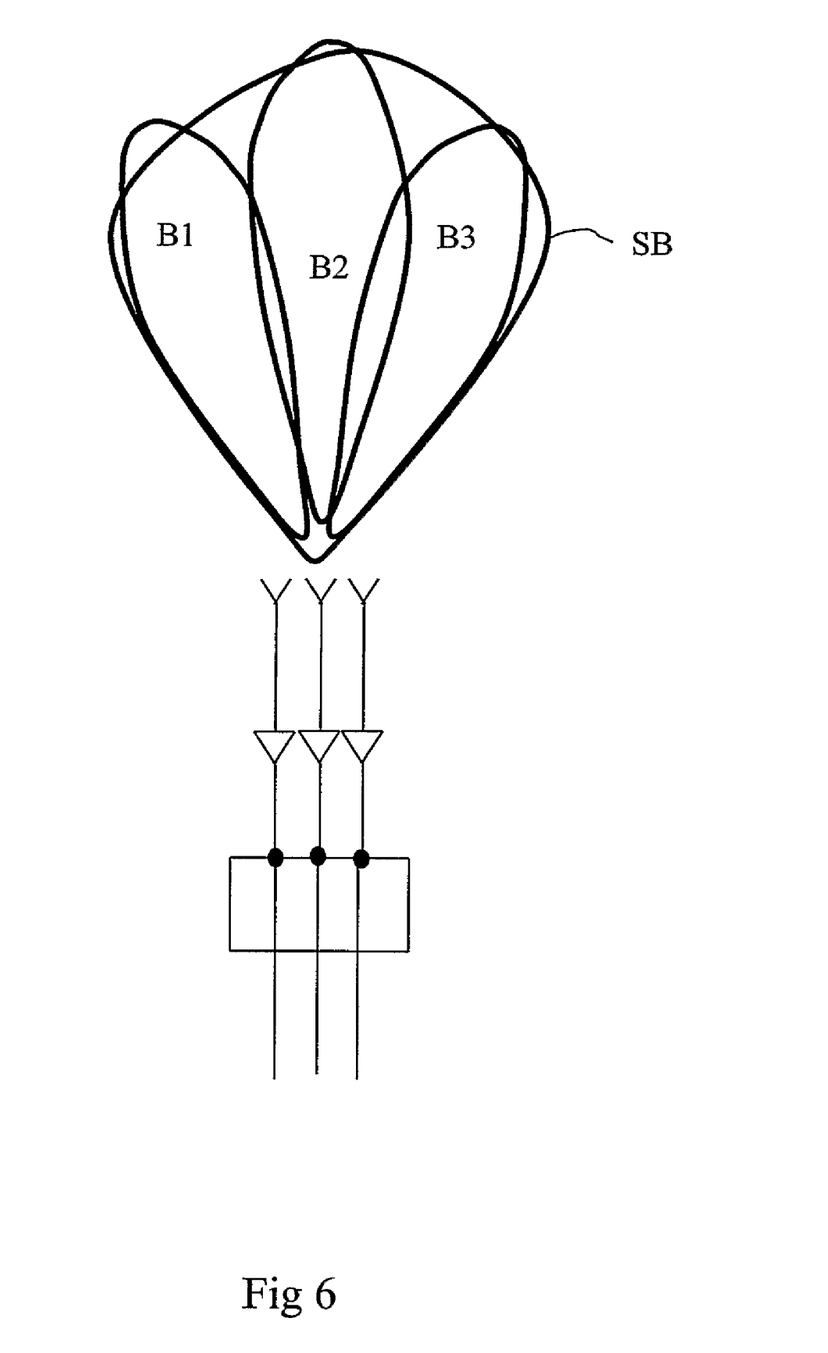

FIG. 4 shows one of the criteria which might be used according to the invention in order to determine if more than one terminal can be allowed to transmit at a time: The antenna radiation pattern for a three-beam antenna system such as the one shown in FIG. 2 is illustrated, with the antenna gain for two of the (receive) beams at one and the same angle $\phi_1$ being indicated. Also indicated is the antenna gain for the second receive beam at a second angle $\phi_2$.

It will be realized that the received signal strength at the antenna is dependent not only on the angle to the antenna, but also depends on the distance from the terminal to the antenna, i.e. path loss. However, the invention is intended mainly for stationary or semi-stationary systems, meaning that either the distance from the central node to the terminal is known since the terminal is fixed, or the system has such knowledge due to signal processing or signalling within the system. Thus, the distance can also be factored into the calculations. In addition, the system may also be one which regulates the output power of the terminals so that the received power is essentially the same at the antenna.

Assume now that a first terminal is already transmitting from the angle $\phi_1$, and that a second terminal, positioned at the angle $\phi_2$, has data to transmit.

Using knowledge of the angular position (with regard to the central node C) of the first and second terminals, as well as knowledge of the antenna gain of the first and second antenna beams at the angles in question, permission for the second terminal to transmit might be granted or not.

In other words, the gain of the second beam at $\phi_1$ is compared to the gain of the same beam at $\phi_2$ in order to see if transmissions from the second terminal should be allowed or not. Thus, if $(G_2(\phi_2)-G_2(\phi_1))>T$, where T is an acceptable level of interference, transmission from the second terminal at $\phi_2$ is allowed to take place at the same time as the first terminal transmits from $\phi_1$.

Naturally, if simultaneous transmission cannot be allowed, the central node C can also stop transmissions from the first terminal in order to allow transmission from the second terminal.

In general, the criteria which could be used for determining if more than one terminal at a time may transmit could be chosen from among the following:

"Trial and error", or in other words, when a second terminal signals that it has data it needs to transmit, that terminal is given permission to transmit. If the bit error rate (or some other means of measuring signal quality) subsequently drops below an acceptable level, one or more of the terminals that are transmitting will be given an order by the main node C to cease its transmissions.

A "look-up" table: since the invention is mainly intended for use in systems with stationary terminals, a "calibration" transmission might be performed, during which different combinations of terminals are allowed to transmit simultaneously. The resulting signal quality which is obtained for different combinations of terminals is then stored in the table. Naturally, the calibration can be carried out not just once, but at intervals, so that the contents of the table are updated.

Knowledge (for example from measurements) of the main node's antenna gain with respect to the terminals $S_1$, $S_2$, ... $S_N$. Assuming that the secondary terminals are stationary and transmit with the same output power:

$$\left. \begin{array}{l} G_1(S_1) - G_2(S_1) > (C/I) \\ G_2(S_2) - G_1(S_2) > (C/I) \end{array} \right\}$$

Thus, if the difference in antenna gain in beam 1, $G_1$, and beam 2, $G_2$ from one and the same first terminal $S_1$ exceeds a required level of, for example, Carrier to Interference, (C/I), at the same time as the difference in antenna gain in beam 2, $G_2$, and beam 1, $G_1$ from one and the same second terminal $S_2$ exceeds the same (or possibly another) required level, the first and the second terminals $S_1$ i and $S_2$ are allowed to transmit at the same time.

If the first and the second terminals aren't stationary or don't transmit with the same output power, the gain G in the equation above can be replaced by the received input power P from the terminals.

If the central node C has prior knowledge of the azimuth angle $\phi_N$ to each of the terminals $S_1, S_2, \ldots, S_N$, which is the case in a stationary system, this knowledge can be used together with knowledge of the antenna pattern of the receive beams:

$$\left. \begin{array}{l} G_1(\Phi_1) - G_2(\Phi_1) > (C/I) \\ G_2(\Phi_2) - G_1(\Phi_2) > (C/I) \end{array} \right\}$$

Again, the above equation is under the assumption that the output power P of each of the terminals is known so that it can also be entered into the calculations, as well as the range R, to each of the terminals.

The invention is not limited to the examples of embodiments which have been shown and described above, but may freely be varied within the scope of the appended claims. For example, the system of the invention has mainly been described by means of a TDMA-system, in which "simultaneous transmission" means transmission in the same time slot. However, the invention can also be applied in other access scheme systems, such as CDMA and FDMA, in which "simultaneous transmission" would mean simultaneous transmission using the same spreading code or the same frequency, respectively.

The invention claimed is:

1. A wireless telecommunications system for stationary or semi-stationary equipment having a main node operable with a first plurality of terminals belonging to the same access subset and arranged to receive from and transmit to the main node, the main node adapted to transmit in at least one transmit beam and receive in at least two receive beams, the system comprising:
   a transmitter in the main node that transmits indications to first and second terminals indicating whether each terminal may or may not transmit to the main node;
   wherein when a first terminal located at a first azimuth angle in a first receive beam is transmitting, the main node is adapted to determine whether a second terminal located at a second azimuth angle in a second receive beam is permitted to transmit simultaneously with the first terminal, wherein the main node permits the second terminal to transmit simultaneously when the difference between the gain of the second beam at the second azimuth angle and the gain of the second beam at the first azimuth angle is greater than a threshold level; and
   wherein upon determining that the second terminal can be permitted to transmit to the main node simultaneously with the first terminal, the transmitter in the main node transmits an indication to the second terminal granting permission for the second terminal to transmit simultaneously with the first terminal.

2. The system of claim 1, wherein the main node is further adapted to determine whether the second terminal is permitted to transmit simultaneously with the first terminal utilizing a look-up table in which the signal quality obtained by different combinations of simultaneous transmissions of terminals is stored.

3. The system of claim 1, wherein the first and second terminals transmit simultaneously using the same frequency, or the same code, or the same time slot.

4. A wireless telecommunications system having a main node operable with a first plurality of semi-stationary terminals belonging to the same access subset and arranged to receive from and transmit to the main node, the main node adapted to transmit in at least one transmit beam and receive in at least two receive beams, the system comprising:
   a transmitter in the main node that transmits indications to first and second terminals indicating whether each terminal may or may not transmit to the main node;
   wherein when a first terminal located at a first azimuth angle in a first receive beam is transmitting, the main node is adapted to determine whether a second terminal located at a second azimuth angle in a second receive beam is permitted to transmit simultaneously with the first terminal, wherein the main node permits the second terminal to transmit simultaneously when:
      the difference between the antenna gain of the first beam with respect to the first terminal and the antenna gain of the second beam with respect to the first terminal is greater than a threshold Carrier-to-Interference (C/I) level; and
      at the same time, the difference between the antenna gain of the second beam with respect to the second terminal and the antenna gain of the first beam with respect to the second terminal is greater than the threshold C/I level; and
   wherein upon determining that the second terminal can be permitted to transmit to the main node simultaneously with the first terminal, the transmitter in the main node transmits an indication to the second terminal granting permission for the second terminal to transmit simultaneously with the first terminal.

5. A wireless telecommunications system having a main node operable with a first plurality of stationary terminals belonging to the same access subset and arranged to receive from and transmit to the main node, the main node adapted to transmit in at least one transmit beam and receive in at least two receive beams, wherein the main node has prior knowledge of a first azimuth angle $\phi_1$ to a first terminal and a second azimuth angle $\phi_2$ to a second terminal, the system comprising:
   a transmitter in the main node that transmits indications to the first and second terminals indicating whether each terminal may or may not transmit to the main node;
   wherein when the first terminal located in a first receive beam is transmitting, the main node is adapted to determine whether the second terminal located in a second receive beam is permitted to transmit simultaneously with the first terminal, wherein the main node permits the second terminal to transmit simultaneously when:
      the difference between the antenna gain of the first beam with respect to the first azimuth angle $\phi_1$ and the antenna gain of the second beam with respect to the first azimuth angle $\phi_1$ is greater than a threshold Carrier-to-Interference (C/I) level; and
      at the same time, the difference between the antenna gain of the second beam with respect to the second azimuth angle $\phi_2$ and the antenna gain of the first beam with respect to the second azimuth angle $\phi_2$ is greater than the threshold C/I level; and
   wherein upon determining that the second terminal can be permitted to transmit to the main node simultaneously with the first terminal, the transmitter in the main node transmits an indication to the second terminal granting permission for the second terminal to transmit simultaneously with the first terminal.

* * * * *

UNITED STATES PATENT AND TRADEMARK OFFICE
CERTIFICATE OF CORRECTION

PATENT NO. : 8,320,357 B2  
APPLICATION NO. : 11/994621  
DATED : November 27, 2012  
INVENTOR(S) : Engstrom et al.

Page 1 of 1

It is certified that error appears in the above-identified patent and that said Letters Patent is hereby corrected as shown below:

In Column 4, Line 46, delete "i and" and insert -- and --, therefor.

Signed and Sealed this
Twenty-sixth Day of February, 2013

Teresa Stanek Rea
*Acting Director of the United States Patent and Trademark Office*